United States Patent [19]
Gordon

[11] Patent Number: 5,417,407
[45] Date of Patent: May 23, 1995

[54] ADJUSTABLE ELASTOMER TORSION DEVICE

[76] Inventor: James R. Gordon, 301 W. Boling, Benton, Ill. 62812

[21] Appl. No.: 262,511

[22] Filed: Jun. 20, 1994

[51] Int. Cl.⁶ .............................................. F16F 1/14
[52] U.S. Cl. .................................. 267/154; 267/277; 267/279
[58] Field of Search ............... 267/273, 276, 277, 278, 267/279, 283, 284, 285, 154; 280/695, 721; 464/88; 474/101; 16/75

[56] References Cited

U.S. PATENT DOCUMENTS

| | | |
|---|---|---|
| 2,690,335 | 9/1954 | Ballard . |
| 3,022,536 | 2/1962 | Floehr . |
| 3,748,687 | 7/1973 | Romberg . |
| 4,094,532 | 6/1978 | Johnson et al. ................ 267/284 X |
| 4,171,920 | 10/1979 | Kramer et al. . |
| 4,533,036 | 8/1985 | Gordon . |
| 4,863,148 | 9/1989 | Hufnagel ............................ 267/278 |
| 4,925,434 | 5/1990 | Swinderman et al. . |
| 5,149,305 | 9/1992 | Gordon . |
| 5,201,402 | 4/1993 | Mott . |
| 5,222,589 | 6/1993 | Gordon . |

*Primary Examiner*—Douglas C. Butler
*Attorney, Agent, or Firm*—Dorn, McEachran, Jambor & Keating

[57] ABSTRACT

An adjustable elastomer torsion device includes a base member aligned in partially nested relation with a resilient elastomer (e.g. rubber or urethane resin) torsion member; parts of the base member and the torsion member overlap each other and an extension portion of the torsion member projects beyond the base member. The base member and the torsion member are interlocked, where they overlap each other, to prevent relative twisting between them, but the interlock does not interfere with twisting of the torsion member extension. An adjustment mechanism provides for adjustment of the positions of the base and torsion members relative to each other to vary the length of the extension portion of the torsion member over a given displacement length and thereby adjust the elastomeric, resilient torsional restoration force (torsional resistance) of the device within a predetermined force range. In some versions, the base member is a resilient elastomer, so that some twisting occurs in the base member; in others the base member does not twist preceptibly.

29 Claims, 8 Drawing Sheets

ADJUSTABLE ELASTOMER TORSION DEVICE

BACKGROUND OF THE INVENTION

Torsion springs have been utilized in a number of different applications; many of those springs have used rubber, urethane, or other elastomeric materials to achieve the action of a torsional spring or a rotary spring. One such device that utilizes rubber is described in Ballard U.S. Pat. No. 2,690,335. A somewhat more sophisticated elastomer torsion spring is disclosed in Kramer et al. U.S. Pat. No. 4,171,920. Specific applications for torsion springs are quite numerous; among others, they include vehicle shock absorbers, gate closers, and biasing devices, often called tensioners, for conveyor belt scrapers. Some can be set in increments to supply a given torsional force; such devices include the conveyor belt scraper biasing devices (tensioners) disclosed in Gordon U.S. Pat. No. 4,533,036 and Swinderman et al. U.S. Pat. No. 4,925,434. Another incrementally adjustable conveyor belt scraper tensioner, which uses a metal coil spring, is described in Mort U.S. Pat. No. 5,201,402. A continuously adjustable rotary bias device, suitable for use as a tensioner in a conveyor belt scraper, that uses a resilient elastomer member for the desired spring action, is described in Gordon U.S. Pat. No. 5,149,305.

A somewhat different torsion spring arrangement, particularly intended for use with a swinging hinged gate, is disclosed in Floehr U.S. Pat. No. 3,022,536. The Floehr device includes a means for adjustment of the spring force. Another torsional gate closer, employing a pre-stressed torsion bar, is described in Romberg U.S. Pat. No. 3,748,687.

Most known elastomer torsion spring devices, particularly those referred to above, have had provision for quite limited adjustment of the torsional restoration force of the device. The device of Gordon U.S. Pat. No. 5,149,305 adjusts a preset bias exerted by a tubular torsion spring having a fixed rate, but the actual torsional force or spring rate, per se, is not adjusted. For some applications this kind of adjustment may be inadequate; an elastomer torsion device in which the restoration force itself (torsional resistance) is adjustable over a broad range is more desirable.

SUMMARY OF THE INVENTION

It is a principal object of the present invention, therefore, to provide a new and improved torsion device, utilizing a resilient elastomer torsion member, that can be readily and rapidly adjusted to vary the torsional resistance (restoration force) of the device over a wide range.

Another object of the invention is to provide a simple, inexpensive, yet highly durable torsion device, employing an elastomer torsion member, that is readily and conveniently adjustable with respect to the restoration force (torsional resistance) that the device supplies.

Accordingly, the invention relates to an adjustable elastomer torsion device comprising a base member, and a resilient elastomer torsion member having an overlap portion aligned in nested relation with the base member and an extension portion projecting beyond the base member. Interlock means are provided, interconnecting the base member and the torsion member; the interlock means preclude relative twisting between the base member and the overlap portion of the torsion member without preventing twisting of the extension portion of the torsion member. The device further comprises adjustment means for adjusting the positions of the base and torsion members longitudinally relative to each other, over a given displacement length, thereby varying the length of the extension portion and adjusting the overall resilient, elastomeric torsional restoration force of the device within a predetermined force range.

In another aspect, the invention relates to an adjustable elastomer torsion device comprising a first tubular torsion member having an internal longitudinal spline and a second torsion member aligned coaxially within the first torsion member and having an external longitudinal spline interlocked with the spline of the first torsion member; an extension portion of one of the first and second torsion members extends axially beyond a predetermined end of the other torsion member. At least one torsion member, the one having the extension portion, is formed of a twistable, resilient elastomer resin. The device further comprises adjustment means for adjusting the first and second torsion members longitudinally relative to each other to adjust the length of the extension portion, thereby modifying the torsion resistance force of the device.

DESCRIPTION OF THE PREFERRED EMBODIMENTS

Figures 1, 2:
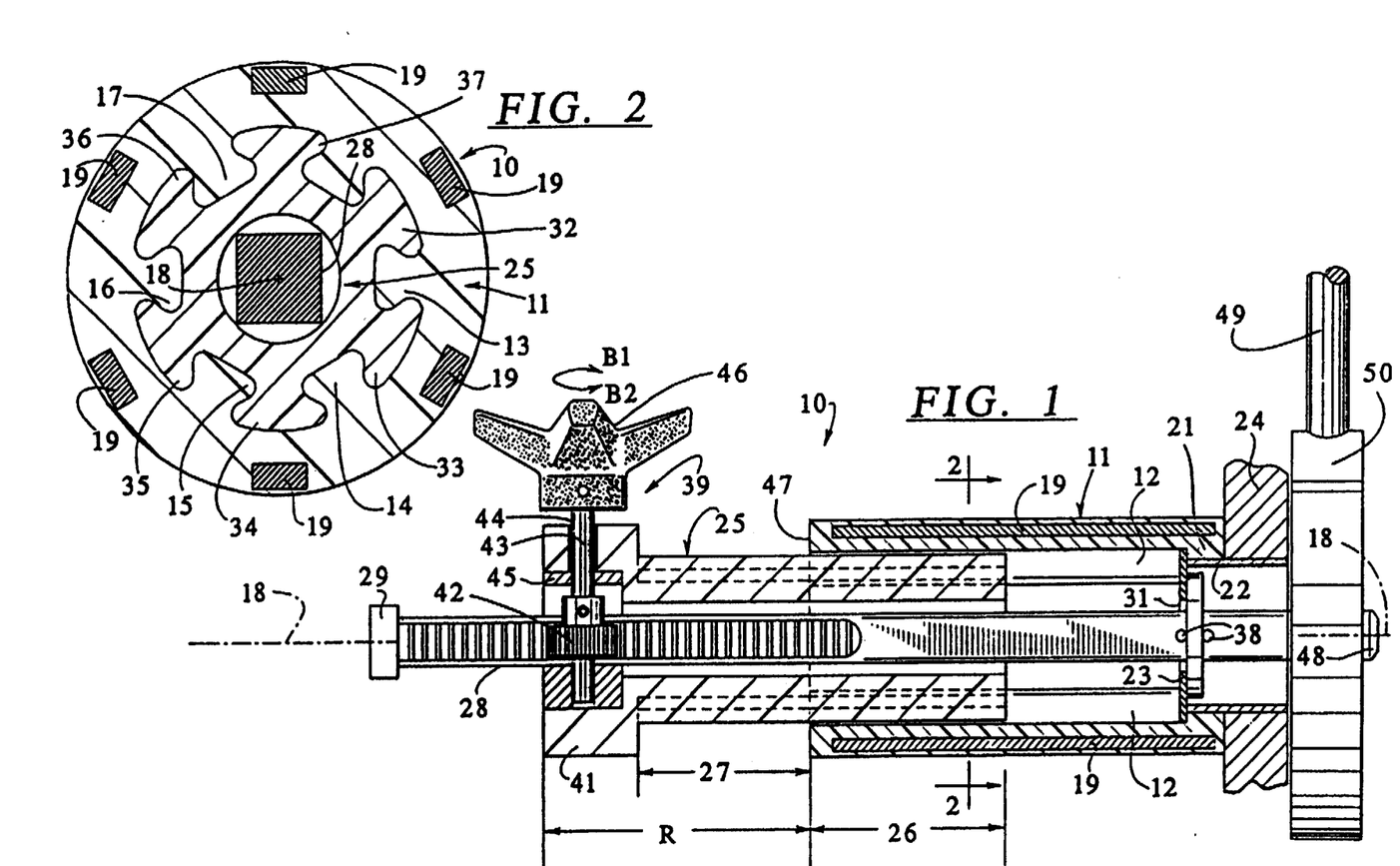
FIG. 1 is a longitudinal section view of a first embodiment of the invention.
FIG. 2 is a cross section view, on an enlarged scale, taken approximately along line 2—2 in FIG. 1.
Figure 3:
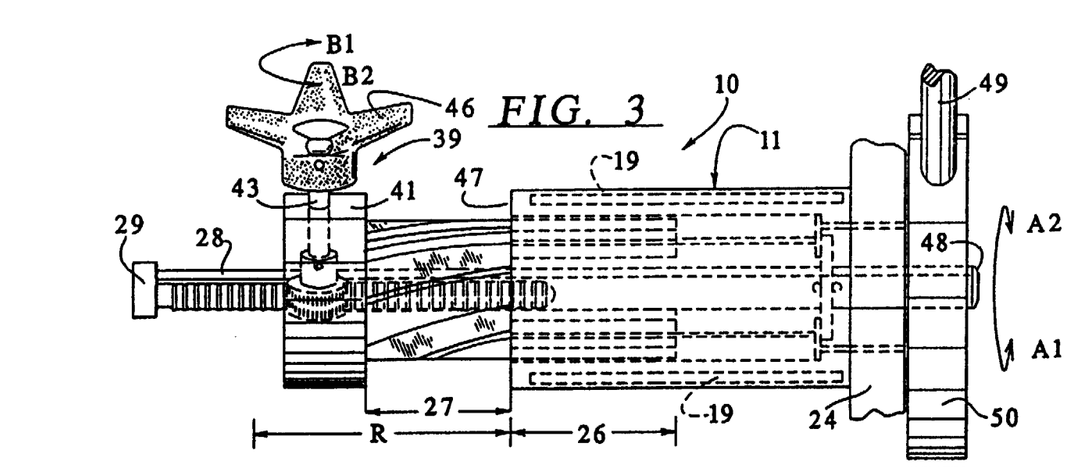
FIG. 3 is an elevation view, on a somewhat enlarged scale, showing operation of the device of FIGS. 1 and 2 at one level of adjustment.
Figure 4:
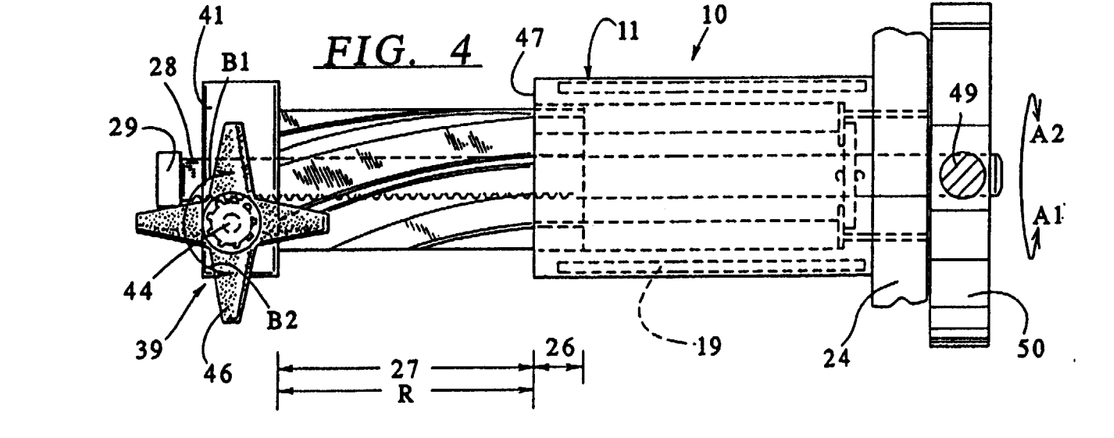
FIG. 4 is a view, similar to FIG. 3, of the same device adjusted to afford a different torsional resistance or restoration force.

FIG. 1, 3, and 4 illustrate a continuously adjustable elastomer torsion device 10 constructed in accordance with a preferred embodiment of the invention. FIG. 2 affords a detail cross sectional view of device 10, taken approximately along line 2—2 in FIG. 1.

Device 10, FIGS. 1-4, comprises a first tubular torsion member 11, sometimes referred to herein as a base member. Base member 11 has an internal longitudinal spline that includes six inwardly projecting elongated spline (key) members 12 through 17 disposed concentrically about a central axis 18 and separated from each other by T-shaped spline receptacles or keyways. The distribution and arrangement of the internal spline projections 12-17 in relation to axis 18, and the configuration of the receptacle spaces between the spline members 12-17, is best shown in FIG. 2. Each of the spline members 12-17 is essentially T-shaped in cross sectional configuration; the spaces between them are also T-shaped.

In the construction illustrated for the torsion bias device 10, FIGS. 1-4, torsion member 11 is of rigid tubular configuration, symmetrical with respect to axis 18. It serves as the base for device 10. In the illustrated construction the base torsion member 11 is of molded urethane resin and has a plurality of longitudinally extending metal stiffener rods or elements 19 molded integrally therein. There is an integral internal shoulder 21 at the right-hand end of torsion member 11. Shoulder 21 engages the peripheral portion 22 of a cup-shaped mounting member that has a flange 23. Flange 23 also engages shoulder 21 of the first torsion member 11, the base of device 10. The cup portion 22 of the mounting member is affixed to a frame 24; frame 24 is not a part of the invention.

Adjustable torsion bias device 10, FIGS. 1-4, further comprises a second torsion member 25 that is aligned coaxially within the first torsion member, base 11. Torsion member 25 is molded of a twistable, elastomeric resin; rubber may be utilized for torsion member 25 but an elastomeric urethane resin in a Shore durometer range of 65 to 90 on the A scale is preferred. The second torsion member 25 has a plurality of elongated external spline members 32-37 that are interleaved one-for-one with the internal splines 12-17 of the first torsion member 11, as best shown in FIG. 2. Each of the outwardly projecting splines 32-37 on torsion member 25 is T-shaped in cross sectional configuration and matches the configuration and size of the space between two of the internal splines 12-17 of base member 11, so that splines 32-37 of torsion member 25 interfit closely with splines 12-17 of base torsion member 11. Consequently, the two torsion members 11 and 25, in the portion 26 where those two torsion members overlap (FIG. 1), cannot twist or rotate relative to each other. Of course, this does not apply to the extension portion 27 of the second torsion member 25 that projects outwardly from the first torsion member, base 11, again as most clearly illustrated in FIG. 1.

The continuously adjustable elastomer torsion device 10 of FIGS. 1-4 further comprises an elongated rigid rack member 28 which, in the illustrated construction, is coaxial with respect to both of the torsion members 11 and 25. That is, all three of the members 11, 25, and 28 are symmetrical with respect to axis 18. Rack 28 extends through both torsion members 11 and 25; it is longer than either of the torsion members. A stop member 29 is mounted on the outer end of rack 28. Rack 28 is pinned to a disk 31 that engages the flange 23 on the mounting member 22,23, as by the pins 38 (FIG. 1). Thus, rack 28, is fixed in its axial position relative to frame 24, but can rotate with respect to the frame.

Device 10 also comprises an adjustment means, shown as a mechanism 39 (FIGS. 1, 3 and 4), for adjusting the first and second torsion members 11 and 25 axially (longitudinally) relative to each other over a given displacement length L in order to adjust the axial length of the extension portion 27 of torsion member 25. This is done to modify the torsion resistance or torsional restoration force of the extension portion 27 of the second torsion member 25 over a predetermined force range, as explained more fully hereinafter.

In the construction illustrated in FIGS. 1, 3, and 4, adjustment means 39 is mounted in a collar 41 that may be molded as an integral part of the outer end of torsion member 25. The adjustment mechanism includes a rotary gear 42 affixed to a shaft 43; gear 42 is in meshing engagement with rack 28. Shaft 43 extends through an opening 44 in collar 41 and is journalled in a bushing 45 mounted in collar 41. An adjustment handle 46 affixed to the outer end of shaft 43 completes the adjustment means, mechanism 39, as illustrated in FIGS. 1, 3 and 4.

At the other end of rack member 28, the right-hand end 48 as seen in FIGS. 1, 3 and 4, means are provided for twisting rack 28 to apply torsional, twisting force to torsion member 25. In the drawings, this force applying means is shown as a disk 50 that is pinned or otherwise affixed to the end 48 of rack 28. Disk 50 may be provided with a handle 49 or any other desired means for rotating rack 28.

In considering operation of the adjustable elastomer torsion device or tensioner 10 of FIGS. 1-4, perhaps the best starting point is the torsionally unstressed position of the mechanism as shown in FIG. 1. That position is much the same as in FIG. 3, except that in FIG. 3 a torsional force has been applied to the device 10 by rotating handle 49 counterclockwise, in the direction of the arrow A1. This rotational movement causes a similar rotation of rack 28, twisting the extension portion 27 of torsion member 25 to the configuration illustrated in FIG. 3. There is no corresponding rotation in the overlap portion 26 between the two torsion members 11 and 25 because those two members are effectively interlocked, where they overlap, by the splines 12-17 of the base, torsion member 11, with the splines 32-37 on the torsion member 25. Twisting of member 11 is effectively precluded by steel inserts 19.

Torsion member 25 resists being twisted to the position illustrated in FIG. 3. When handle 49 is released, the extension portion 27 of torsion member 25 drives device 10 back to the position shown in FIG. 1, from that of FIG. 3, due to the resilient, elastomeric construction used for torsion member 25. The torsional resistance of the extension portion 27 of torsion member 25 does not change so long as the relative positions of torsion members 11 and 25 remain as shown in the drawings, FIGS. 1 and 3.

In a given instance, it may be desired to reduce the torsional resistance (the torsional restoration force) of device 10. To that end, adjustment handle 46 may be turned clockwise, in the direction of arrow B1 in FIG. 1. When this is done, adjustment mechanism 39 pulls the integral collar 41 of torsion member 25 longitudinally outwardly from torsion member 11; this adjustment may continue to the maximum extension position shown in FIG. 4. The limit for this movement is provided by stop member 29 on the outer end of rack 28. Stop member 29 precludes further outward movement of collar 41 when the stop is engaged by bushing 45. In this position, the torsional resistance (restoration force) of the extension portion 27 of torsion member 25 is materially diminished. Consequently, application of the same torsional force to handle 49 when in this position (FIG. 4) twists the outer end of torsion member 25 much farther than it did in the previous example, FIG. 3. The result is that, although the force applied to handle 49 is the same, the twisting or rotational movement of the outer end of torsion member 25 and rack 28 is much greater, as illustrated in FIG. 4. When handle 49 is released, the torsion restoration force exerted by torsion member 25, and particularly its extension portion 27, returns rack 28 and the second torsion member 25, in the direction of arrow A2, to their original positions.

Reverse rotation of handle 46 of adjustment means 39, in the direction of the arrow B2 (FIG. 1) produces an equal but opposite result. Thus, if handle 46 is rotated to drive torsion member 25 longitudinally along rack 28, to the right in FIG. 1, decreasing the length of extension portion 27 and increasing the length of overlap portion 26 within torsion member 11, the torsional resistance (restoration force) is increased. The ultimate limit for this movement is engagement of collar 41 of torsion member 25 with the outer end 47 of the base of device 10, torsion member 11. At this limit position, not illustrated in the drawings, the length of extension portion 27 of torsion member 25 is essentially zero; to all intents and purposes the torsional resistance of device 10 is virtually infinite. It cannot be twisted. It is thus seen that the total adjustment displacement length device 10 corresponds to the length L, FIGS. 1, 3 and 4.

It will be recognized that device 10, as regards the application of torsional force through handle 49 or other appropriate means, functions bidirectionally. That is, the initial application of force to rack 28 in the direction of arrow A2 is resisted, by extension portion 27 of torsion member 25, to the same extent and by the same restoration force as would be true of an application of equal force in the direction of arrow A1. Adjustment of the length of the extension portion 27 over its total displacement length L (from stop member 41 to surface 47, FIG. 1) adjusts the restoration force of device 10 continuously over a predetermined range.

Figure 5:
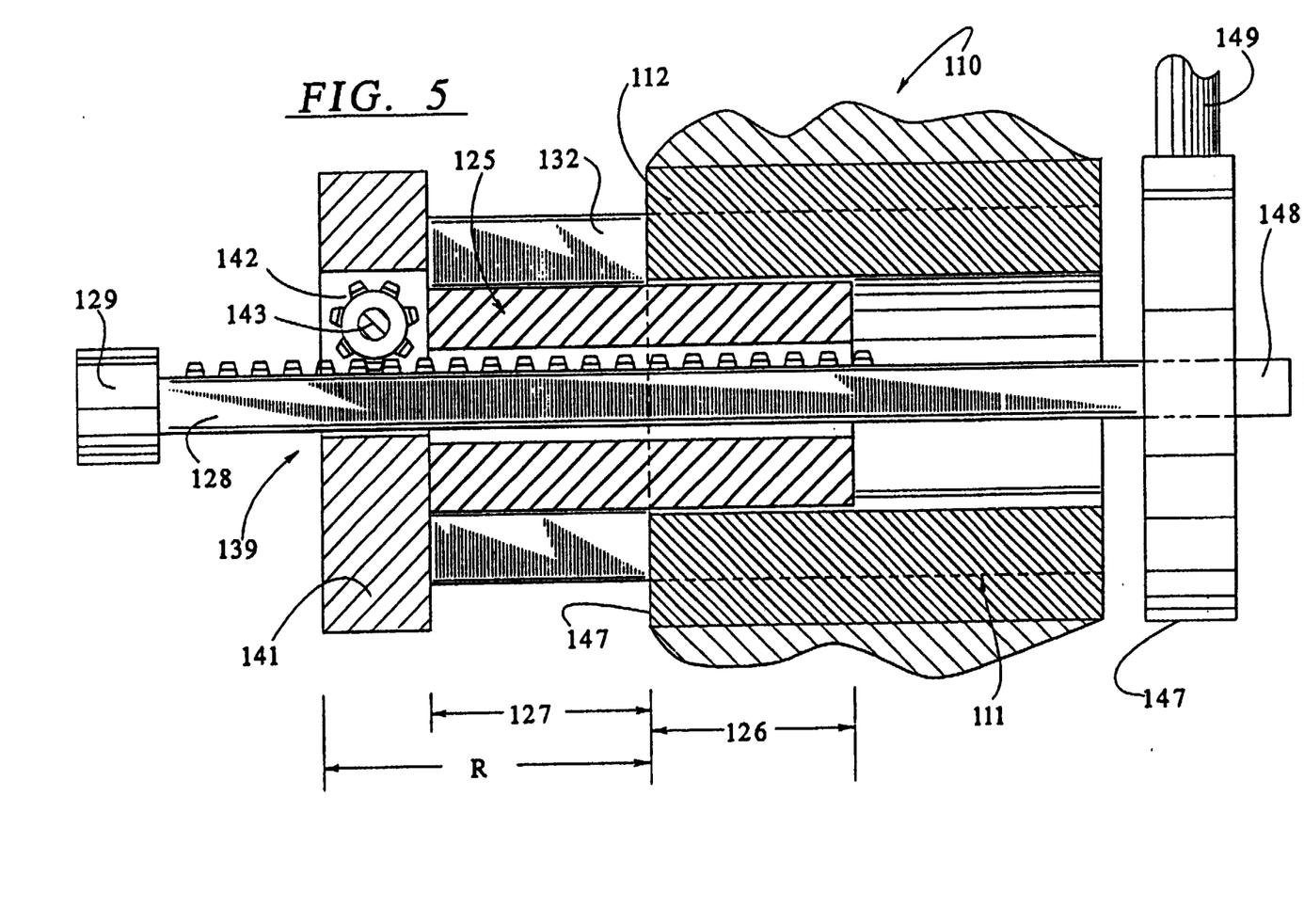
FIG. 5 is a partly schematic sectional view, similar to FIG. 1, illustrating another embodiment of the invention.
Figure 6:
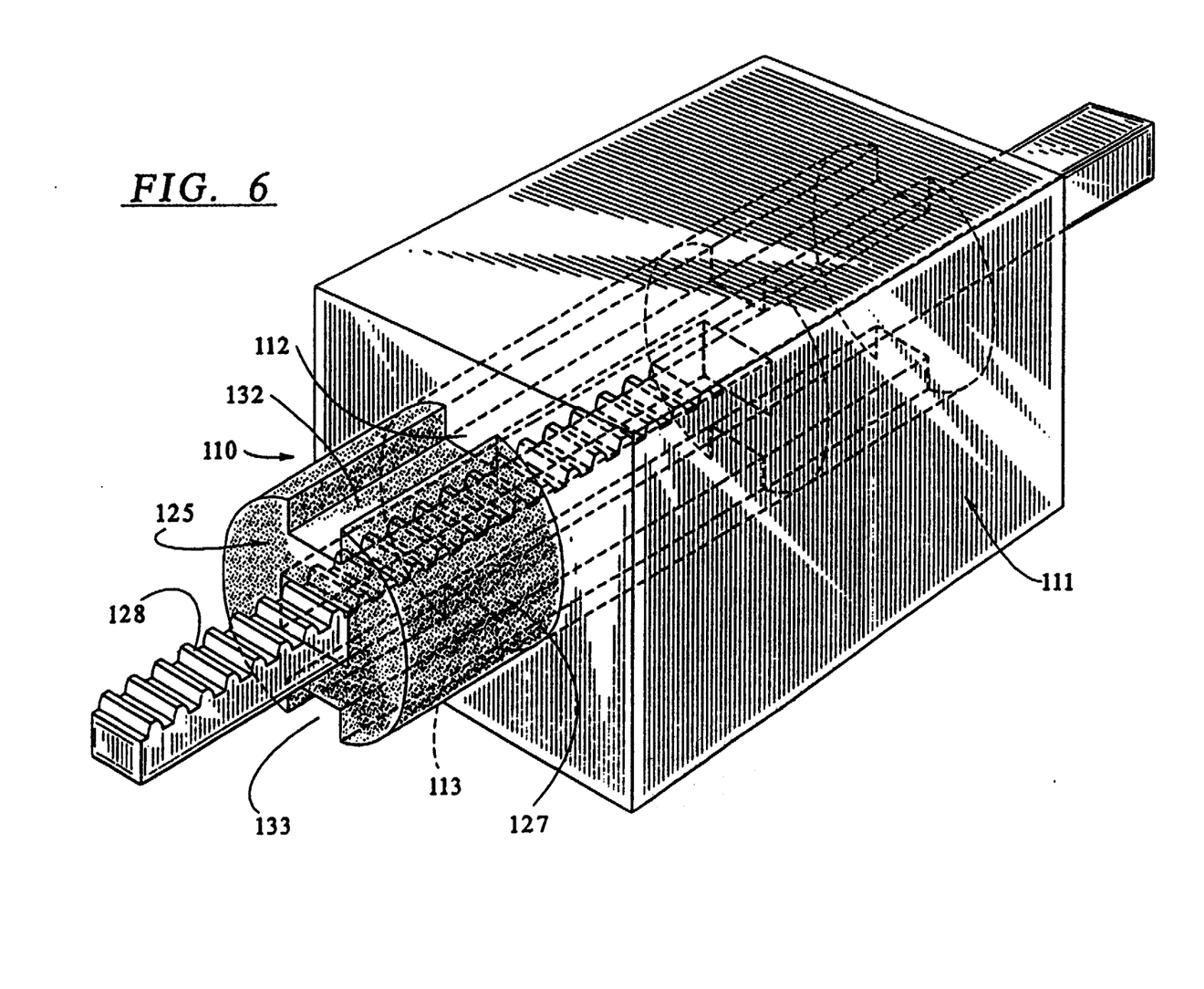
FIG. 6 is an orthagonal view of the device shown in FIG. 5 with portions removed for improved illustration.

FIGS. 5 and 6 illustrate a continuously adjustable torsion device 110 comprising another embodiment of the present invention. Device 110 includes a first torsion member 111 that is tubular in the sense that it has a central axial opening. As in the previously described embodiment, the first torsion member 111 is the base of device 110. Member 111, however, differs from the first torsion member 11 in the previously described embodiment because it is rectangular in external configuration. Furthermore, the first torsion member 111 of device 110 is preferably molded or otherwise formed from a material that is relatively rigid and hence not subject to appreciable twisting deformation. Member 111 could be formed of a metal block, machined to the configuration illustrated in FIGS. 5 and 6. Preferably, a rigid plastic molding is employed. Torsion member 111 has two internally projecting spline or key members 112 and 113. These members are shown as being rectangular in cross sectional configuration but they could be T-shaped in cross section as in the first embodiment.

In the continuously adjustable elastomer torsion device 110 of FIGS. 5 and 6 there is a second torsion member 125 that is aligned coaxially with and nested within the central opening in the first torsion member 111. This second torsion member 125 may be made of rubber, of an elastomeric urethane, or of another twistable elastomeric resin. It has two longitudinal spline slots or keyways 132 and 133 that receive the key members 112 and 113, respectively, of the first torsion member 111.

As before, in one longitudinal portion 126 (FIG. 5) the two torsion members 111 and 125 overlap within the central aperture of torsion member 111. However, there is an extension portion 127 of torsion member 125 that projects beyond torsion member 111. The outer end of the second torsion member 125, the end of the torsion member opposite torsion member 111, is affixed to a rigid collar 141, shown in FIG. 5 as a metal collar. Collar 141 could be molded integrally with torsion member 125, as in the first embodiment, if desired. An elongated, rigid rack 128 extends axially through the assembly afforded by torsion members 111 and 125 in device 110. As shown in FIG. 5, a stop member 129 may be mounted on the outer end of rack 128, beyond collar 141. A torsion disk 147 equipped with a handle 149 is shown mounted on the other end 148 of rack 128. Other appropriate torsion force applying means can be substituted for disk 147 and handle 149 as desired.

Torsion device 110 includes an adjustment mechanism 139 that is illustrated in FIG. 5 but has been omitted from FIG. 6. As before, the adjustment mechanism includes a shaft 143 mounted in collar 141. Shaft 143 carries a gear 142 that engages rack 128. The adjustment means 139 thus connects rack member 128 to the outermost end of torsion member 125 so that the adjustment means can be used to adjust the torsion member 125 longitudinally relative to torsion member (base) 111 over a given displacement length L. In this way, the length of the axial extension portion 127 may be adjusted, by mechanism 139, to modify the torsional resistance of device 110 within a predetermined force range.

Operation of the adjustable torsion device 110 of FIGS. 5 and 6 is essentially similar to that described above in connection with FIGS. 1–4 and accordingly is not repeated. There are some differences in the two devices, though the operation is essentially the same. Instead of a six-spline interconnection between the two torsion members 111 and 125, two keys and mating keyways are employed in device 110. The one torsion member 111 is a rigid member throughout, instead of constituting a urethane resin member with stiffening elements molded into that member. Collar 141, as previously noted, is not an integral part of the second torsion member 125, but the resilient elastomer torsion member 125 serves the same purpose in this embodiment of the invention as the torsion member 25 in the prior embodiment. As before, the longitudinal movement length L of torsion member 125 relative to base torsion member 111 is limited at one end by a stop member 129 on rack 128 and at the other end by engagement of collar 141 with the end surface 147 of the first torsion member, base 111. As before, device 110 is bidirectional; the extension portion 127 of torsion member 125 may be initially twisted either clockwise or counter clockwise. Either way, device 110 performs the same.

Figure 7:
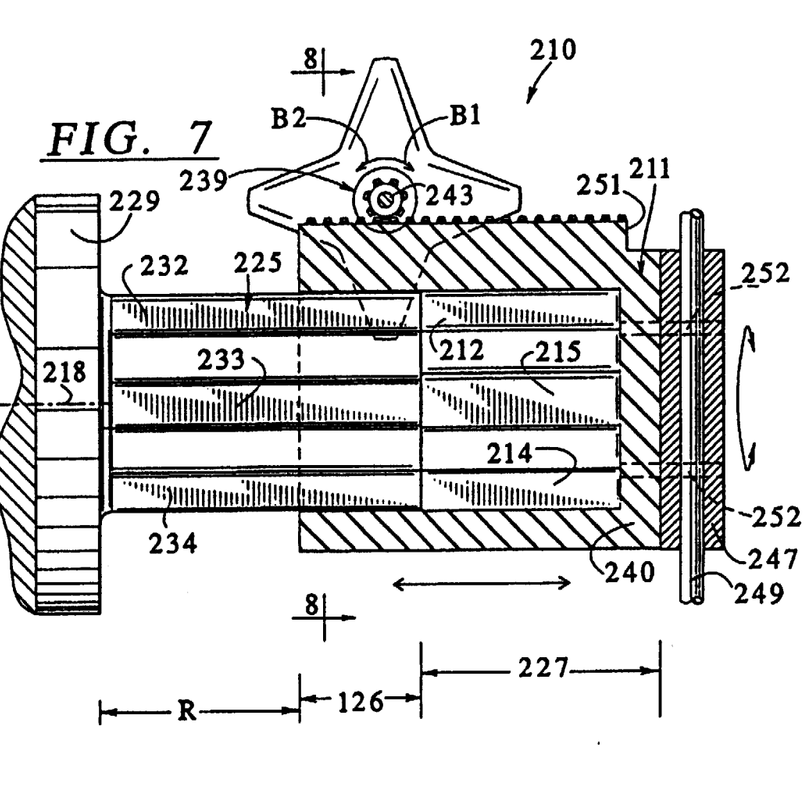
FIG. 7 is a partly schematic sectional elevation view, similar to FIGS. 1 and 5, of a further embodiment of the invention.
Figure 8:
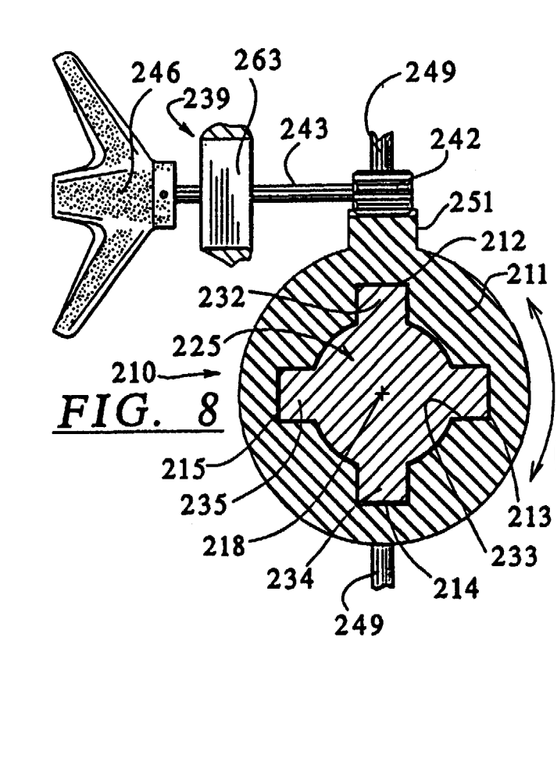
FIG. 8 is a detail sectional view taken approximately along line 8—8 in FIG. 7, with a portion of the device omitted to improve the illustration.

A further embodiment 210 of the invention, with somewhat greater differences, is shown in FIGS. 7 and 8. The continuously adjustable torsion device 210 schematically illustrated in FIGS. 7 and 8 includes a first tubular torsion member 211 in which there are four keyways 212-215, as best shown in FIG. 8. In device 210, the first torsion member 211 is not a rigid base element; instead it is the twistable, elastomeric member of the device. That is, member 211 is preferably molded from a twistable, resilient elastomeric resin such as rubber or, preferably, an elastomeric urethane resin in the range of 65 to 90 durometer Shore A.

As best shown in FIG. 7, the outer or right-hand end of torsion member 211 is secured to a rigid disk 247 that serves to apply an input torsional force to the device. Any preferred means for securing disk 247 to torsion member 211, such as the two pins 252 shown in FIG. 7, may be utilized. Disk 247 is shown equipped with a handle 249 to apply a torsional force to the device, and particularly to the right hand end 240 of torsion member 211. Other torsion force application mechanisms may be used.

The continously adjustable elastomer torsion device 210 of FIGS. 7 and 8 also includes a second torsion member 225 which functions as the base of device 210. This second torsion member 225 fits into torsion member 211 and has four external keys 232-235 each received in a respective one of the keyways 211-215 in the first torsion member 211. Keys 232-235 and keyways 212-215 are shown as rectangular in cross section (FIG. 8) but T-shaped keys and keyways may be used. Torsion member 225 may be formed of stiff, relatively untwistable material. It is shown as a metal rod with projecting keys 232-235. In the illustrated construction all of the members thus far described are symmetrical with respect to a central longitudinal axis 218. The outer, left-hand end of the second torsion member 225, the end of the second torsion member farthest from the first torsion member 211, is secured to an anchor or disk member 229 (FIG. 7). Member 229 may be affixed to a frame or otherwise anchored in fixed position.

A rack 251 projects radially outwardly of the first torsion member 211. Preferably, rack 251 is integral with member 211. Rack 251 is engaged by a gear 242 mounted on a shaft 243 that is a part of an adjustment mechanism 239. As best shown in FIG. 8, shaft 243 may extend through and may be journalled in a fixed bearing block 263. Block 263 may be mounted on a frame or otherwise held in fixed position relative to device 210. An adjustment handle 246 is mounted on the end of shaft 243 opposite gear wheel 242, as shown in FIG. 8.

In device 210, FIGS. 7 and 8, as in the previously described embodiments of the invention, there is a portion 226 where the two torsion members 211 and 225 overlap; see FIG. 7. However, there is an additional portion 227 of torsion member 211, which in this instance is the twistable elastomer element of the torsion device, that projects beyond the second torsion member 225. By adjusting the length of this extension portion 227 over a given displacement length, utilizing the adjustment means 239, the torsional resistance (torsion restoration force) of device 210 may be adjusted to any desired level. Thus, by rotating shaft 243 and gear 242 in the direction of arrow B1, the first torsion member 211 can be moved farther on to the second torsion member 225, materially increasing the torsion resistance of device 210. Conversely, by rotating shaft 243 and its gear 242 in the opposite direction as indicated by arrow B2, the extension portion 227 of torsion member 211 is elongated, the torsion resistance of the device is reduced, and it is easier to twist the device. Of course, with this adjustment the device exerts a lower torsional restoration force when twisted. As in the previous embodiments, device 210 is fully bidirectional (clockwise or counter clockwise) in its operation.

Figure 9:
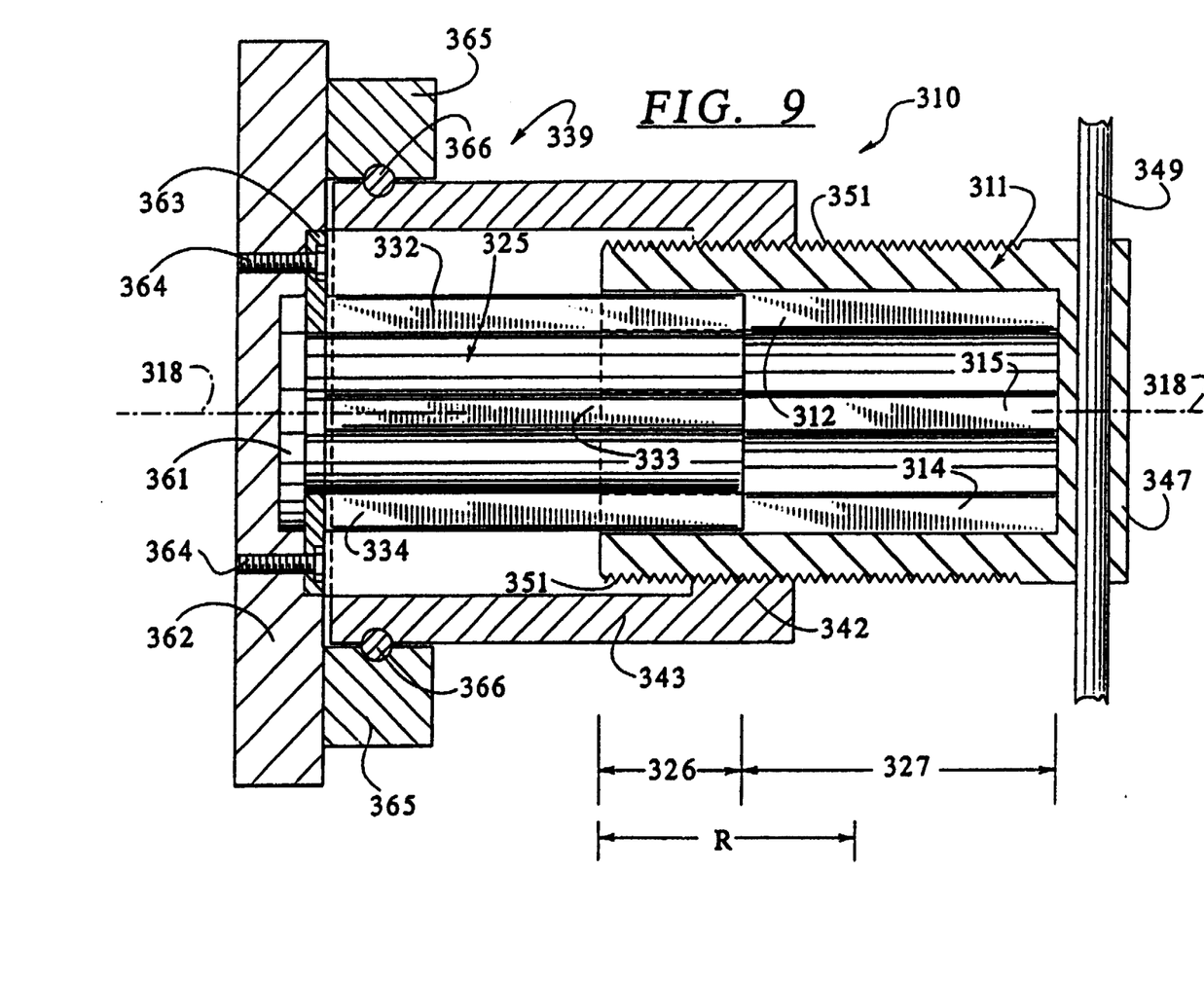
FIG. 9 is a partly schematic sectional elevation view, like FIGS. 1, 5 and 7, of yet another embodiment of the invention.

Yet another embodiment of the invention is shown in FIG. 9; it is similar to but different from the construction shown in FIGS. 7 and 8. The adjustable torsion device 310 schematically illustrated in FIG. 9 includes a first tubular torsion member 311 in which there are four keyways like those shown in FIG. 8; three of those keyways 312, 314 and 315 appear in FIG. 9. In device 310, the first torsion member 311 is not a rigid base element; it is the twistable, resilient elastomeric member of the device. Thus, member 311 is preferably molded from a twistable, elastomeric resin such as rubber or, preferably, an elastomeric urethane resin in the range of 65 to 90 durometer Shore A. As shown in FIG. 9, the outer or right-hand end of torsion member 311 is an integral disk 347 that serves to apply an input torsional force to the device. Disk 347, which may be made more rigid than the body of torsion member 311, is equipped with a handle 349 to apply a torsional force to the device, and particularly to the "free" end of torsion member 311. Apart from reference numerals, a cross-section view of device 30, FIG. 9, would be much like device 210 of FIG. 8.

The adjustable torsion device 310 of FIG. 9 includes a second torsion member 325 which functions as the base of the device. This second torsion member 325 fits into torsion member 311 and has four external keys (keys 332-334 appear in FIG. 9) each received in a respective one of the keyways 312-314 in the first torsion member 311. The keys and mating keyways may be rectangular in cross-section as in FIG. 8; T-shaped keys and keyways, or other configurations, may be used. Torsion member 325 may be of stiff, relatively untwistable construction. It is shown as a metal rod with projecting keys. In the illustrated construction, all of the members thus far described are symmetrical with respect to a central axis 318. The outer, left-hand end of the second torsion member 325, the end of that torsion member farthest from the first torsion member 311, includes an integral flange 361 that fits into a recess in a frame member 362 and is mounted therein by a mounting member 363 secured to the frame by appropriate means such as a plurality of screws 364. The second torsion member 325 of device 310 serves as the base for the device 310.

The outer peripheral surface of the first torsion member 311 is formed with a continuous external helical thread 351 engaged by the internally threaded end 342 of an adjustment cylinder 343. Cylinder 343 is rotatably mounted on frame member 362 by a retainer flange 365 welded to the frame member and a retainer ring 366 that permits cylinder 343 to rotate but restrains the cylinder against axial movement. The members 342,343, 365 and 366, in conjunction with thread 351, constitute an adjustment means 339 for varying the relative axial positions of torsion members 311 and 325 over a given displacement length.

In adjustable elastomer torsion device 310, FIG. 9, as in the previously described embodiments, there is a portion 326 where the two torsion members 311 and 325 overlap. However, there is an additional extension portion 327 of torsion member 311, which is the twistable element of the torsion device, that projects beyond the second torsion member 325. By adjusting the length of this extension portion 327, utilizing adjustment means 339, the torsional resistance (torsion restoration force) of device 310 may be adjusted to any desired level within a predetermined force range. Thus, by rotating cylinder 343 in one direction, the first torsion member 311 can be moved farther on to the second torsion member 325, materially increasing the torsion resistance and restoration force of device 310. Conversely, by rotating cylinder 343 in the opposite direction the extension portion 327 of torsion member 311 is elongated, the torsion resistance of the device is reduced, and it is easier to twist the device. Of course, with this adjustment the device exerts a lower torsional restoration force when twisting is finished. As in the previous embodiments, device 310 is fully bidirectional (clockwise or counter clockwise) in its operation.

Figures 10, 11:
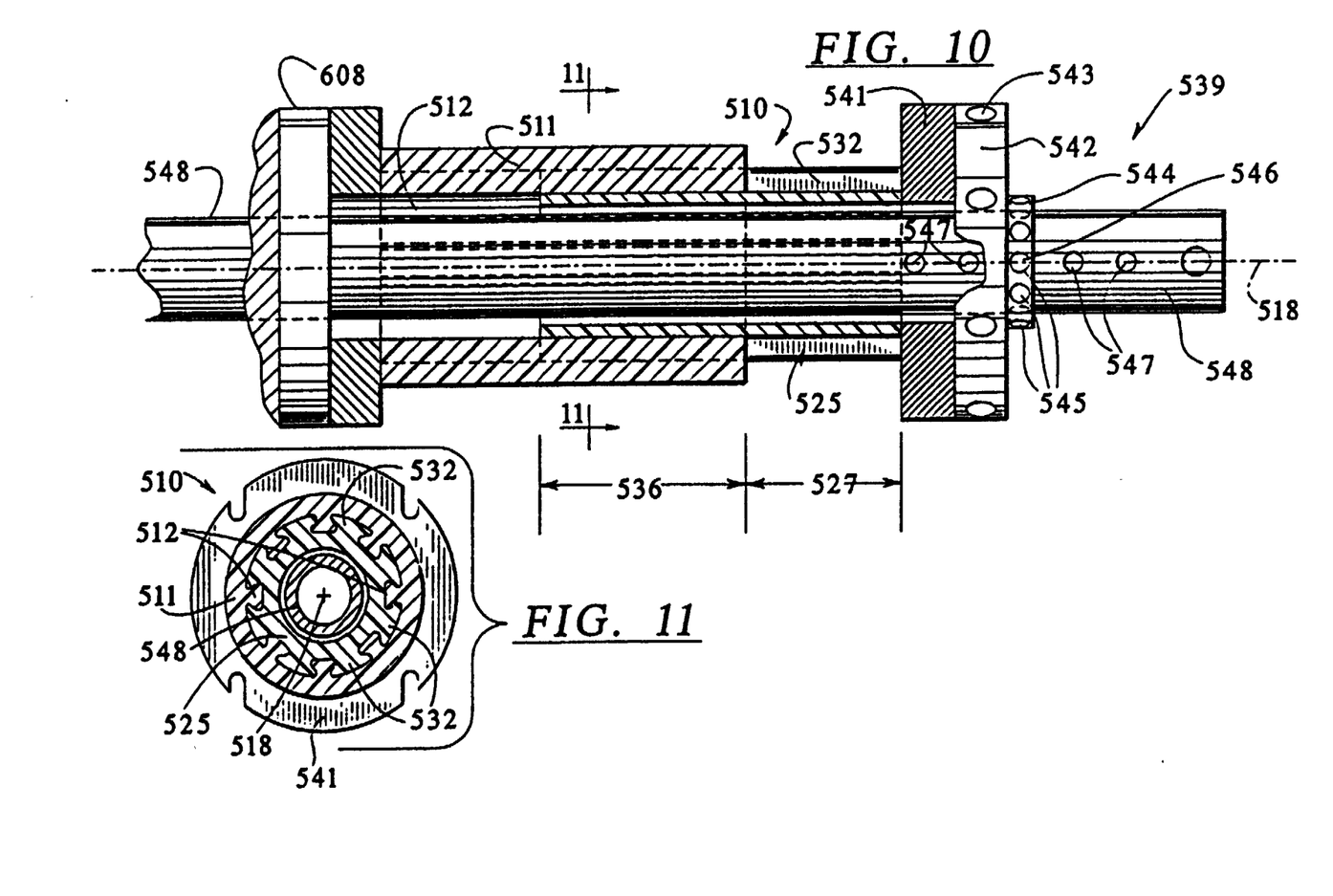
FIG. 10 is a longitudinal partly sectional view of an additional embodiment of the invention.
FIG. 11 is a cross-section view taken approximately along line 11—11 in FIG. 10.

FIGS. 10 and 11 illustrate an adjustable torsion device 510 comprising another embodiment of the present invention. Device 510 includes a first tubular torsion member 511. As in the first-described embodiment, the first torsion member 511 serves as the base of device 510. Member 511 is like the first torsion member 11 in the device 10 of FIGS. 1-4 because, externally, it is circular in configuration. The first torsion member 511 of device 510 may be molded or otherwise formed from a material that is relatively rigid and hence not subject to appreciable twisting deformation; preferably, however, torsion member 511 is molded from elastomer urethane resin in the range of 65 to 90 durometer, Shore scale A, in the configuration illustrated in FIGS. 10 and 11. Torsion member 511 has eight internally radially projecting spline or key members 512 separated by a corresponding number of keyways. These members are shown in FIG. 11 as being T-shaped in cross section, just as in the first embodiment.

In the adjustable elastomer torsion device 510 of FIGS. 10 and 11, there is a second torsion member 525 that is aligned coaxially with and that is nested within the central opening in the first torsion member 511. This second torsion member 525 may be made of rubber, of an elastomeric urethane, or of another twistable elastomeric resin. It has eight T-shaped, radially projecting longitudinal splines or keys 532, as shown in FIG. 11. Splines 532 are separated by a corresponding number of keyways that receive the key members 512 of the first torsion member 511.

As before, in one longitudinal portion 526 (FIG. 10) the two torsion members 511 and 525 overlap within the central aperture of the base torsion member 511. However, there is an extension portion 527 of torsion member 525 that projects beyond torsion member 511. The outer end of the second torsion member 525, the end of the torsion member opposite torsion member 511, is affixed to a rigid collar 541, shown in FIG. 10 as a metal collar. Collar 541 could be molded integrally with torsion member 525, as in the first embodiment, if desired. Collar 541 includes an outer portion 542 having a plurality of radial holes 543 for receiving a torque-applying tool. A further ring 544, in which a plurality of radial adjustment openings 545 are formed, is affixed to part 542 of collar 541. A pin 546 may be mounted in one of the openings 545 and extends into one of a series of holes 547 in a support pipe 548 that extends co-axially through the central opening in device 510. Pipe 548 is symmetrical about the longitudinal axis 518.

Torsion device 510 includes the adjustment mechanism 539. Adjustment mechanism 539 includes shaft 548, its holes 547, pin 546, collar extension 544, and the adjustment openings 545. The adjustment means 539 thus connects collar 541,543 on the outermost end of torsion member 525 to pipe 548. Adjustment means 539 can be used to adjust the axial alignment of torsion member 525 relative to the other torsion member (base) 511 over a given displacement length L corresponding to the distance between the outermost holes 547 in support pipe 548. In this way, the length of the axial extension portion 527 may be adjusted, by mechanism 539, to modify the torsional resistance of device 510 within a predetermined force range. In FIG. 10, extension portion 527 is shown at its middle position; it can be shortened to increase the torsional resistance or lengthened to decrease the torsional resistance of device 510.

Operation of the adjustable torsion device 510 of FIGS. 10 and 11 is generally similar to that described above in connection with device 10 of FIGS. 1-4. However, there are some differences in the two devices. Instead of a six-spline interconnection between the two torsion members 11 and 25 of FIGS. 1-4, eight keys and mating keyways are employed in device 510. The base torsion member 511 in device 510 is resilient, instead of having stiffening elements molded into it; however, stiffeners or even a rigid base member could be used if desired. Collar 541, as previously noted, is not an integral part of the second torsion member 525, but the resilient elastomer torsion member 525 serves the same purpose in this embodiment of the invention as the torsion member 25 in device 10. As before, longitudinal movement of torsion member 525 relative to base torsion member 511 is limited in both longitudinal directions. Moreover, as before, device 510 is torsionally bidirectional; the extension portion 527 of torsion member 525 may be initially twisted either clockwise or counter clockwise. Either way, device 510 performs the same.

Figure 12:
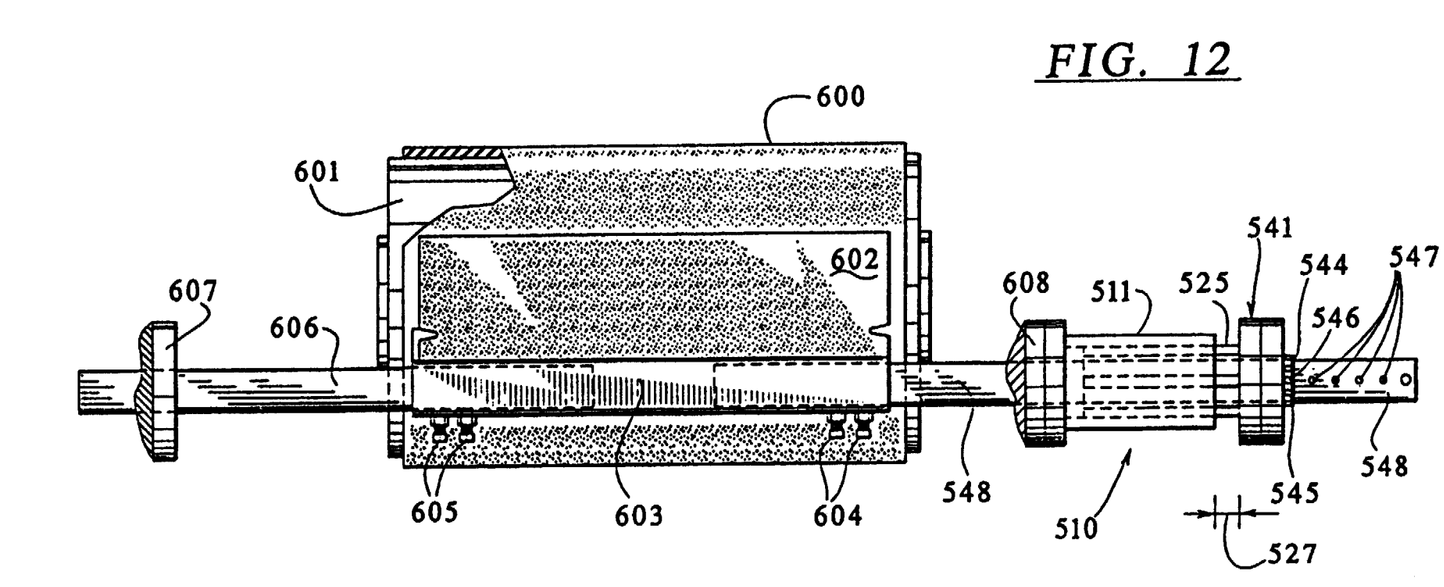
FIG. 12. is an end elevation view showing how the device of FIGS. 10 and 11 may be utilized in a conveyor belt scraper installation.

FIG. 12 shows the adjustable elastomer torsion device 510 used as a tensioner or bias device in a conveyor belt scraper for cleaning the external surface of a conveyor belt 600 passing around a head pulley 601. The belt cleaner installation includes a belt scraper blade 602 mounted on a square tubing section 603 that is a part of scraper blade 602. This is the scraper blade of Gordon U.S. Pat. No. 5,222,589. At one end, tubing 603 fits over a portion of support pipe 548 of device 510 and is secured to the support pipe by appropriate means such as two set screws 604. The other end of tubing 603 fits over and is secured to a support pipe 606 having the same outer diameter as support pipe 548 by suitable means such as two set screws 605. A collar 607 is affixed to support pipe 606 and is mounted on a fixed frame (not shown). Similarly, the collar 608 that is a part of torsion member 511 (see FIG. 10) is secured to another frame member (not shown). In FIG. 12, device 510 is shown adjusted to its highest torsion level, with pin 546 engaged in the innermost hole 547 in pipe 548.

Adjustment of the effective torsional resistance of device 510 is carried out simply by movement of its collar 541 longitudinally of support pipe 548 and engagement of pin 546 in any one of the five holes 547. Whenever the conveyor belt scraper blade 602 is driven pivotally outwardly from the illustrated position engaging belt 600, as by a heavy deposit on the conveyor belt or by a mechanical splice in the belt, it is promptly restored to its original position by the torsional resistance of device 510. The amount of torsional resistance of course, is adjusted by the position of collar 541 and the related adjustment of the length of extension 527 of torsion member 525 relative to torsion member 511.

From the drawings and the foregoing description, it will be apparent that many variations can be made in the construction of the adjustable elastomer torsion device of the invention; of course, further modifications are possible. In each embodiment there are two torsion members; one torsion member, which usually serves as the base of the device, may be still or resilient. The other torsion member is always elastomeric and resilient. The two torsion members are partially nested to afford an overlap portion where they cannot rotate relative to each other. An extension portion of the resilient torsion member, projecting from the other torsion member, can be twisted.

In each embodiment there is an adjustment means to vary the length of the extension portion of the resilient torsion member, thereby adjusting the torsional resistance, or torsional restoration force of the device. Stated differently, the adjustment means changes the length of the extension portion of the resilient, elastomeric twistable torsion member so that the torsional resistance of the device may be made quite low or very high, over a broad range. The devices are all bidirectional in operation; if rotation in only one direction is necessary, it is readily possible to block rotation in the opposite direction.

I claim:

1. An adjustable elastomer torsion device comprising:
   a first tubular torsion member having an internal longitudinal spline;
   a second torsion member aligned coaxially within the first torsion member so that a portion of the second torsion member is overlapped by a portion of the first torsion member, the second torsion member having an external longitudinal spline interlocked with the internal spline of the first torsion member;
   an extension portion of one of the first and second torsion members extending longitudinally beyond a predetermined end of the other torsion member;
   the one torsion member being formed of a twistable, resilient elastomer resin;
   and adjustment means, for adjusting the first and second torsion members longitudinally relative to each other to adjust the axial length of the extension portion, thereby modifying the torsion resistance of the device.

2. An adjustable elastomer torsion device, according to claim 1, in which the other torsion member is also formed of a twistable, resilient elastomer resin.

3. An adjustable elastomer torsion device according to claim 1, in which the other torsion member is of a stiff, relatively untwistable construction.

4. An adjustable elastomer torsion device, according to claim 1, in which the device further comprises an elongated rack member aligned paraxially to the torsion members and mechanically connected to torsion member, and the adjustment means includes the rack member.

5. An adjustable elastomer torsion device according to claim 1 in which the first and second torsion members each include a plurality of elongated spline elements, with the spline elements of the first and second torsion members interleaved one-for-one in a predetermined geometrical configuration about a common axis.

6. An adjustable elastomer torsion device according to claim 5 in which the predetermined geometrical configuration is circular and is concentric about the common axis.

7. An adjustable elastomer torsion device according to claim 5 in which the second torsion member is of elastomeric resin and has a longitudinal internal opening therethrough, and in which a rack member extends axially through the internal opening in the second torsion member.

8. An adjustable elastomer torsion device according to claim 7 in which the rack member is coaxial with both of the torsion members.

9. An adjustable elastomer torsion device according to claim 8 in which the predetermined geometrical configuration is circular and is concentric about the common axis.

10. An adjustable elastomer torsion device according to claim 9 in which the length of the rack member is greater than the length of either torsion member.

11. An adjustable elastomer torsion device according to claim 'and further comprising:
    torsional force applying means, connected to the one torsion member, for twisting the extension portion of the one torsion member.

12. An adjustable elastomer torsion device according to claim 11 in which the first and second torsion members each include a plurality of elongated spline elements of T-shaped cross section configuration, with the spline elements of the first and second torsion members interleaved one-for-one in a predetermined geometrical configuration about a common axis.

13. An adjustable elastomer torsion device according to claim 12 in which the device includes a rack member that is aligned paraxially with both of the torsion members.

14. An adjustable elastomer torsion device according to claim 11 in which the predetermined geometrical configuration is circular and is concentric about the common axis.

15. An adjustable elastomer torsion device according to claim 14 in which the device includes a rack member having a length greater than the length of either torsion member.

16. An adjustable elastomer torsion device, according to claim 1, in which the one torsion member is of tubular configuration and is of molded urethane resin having a durometer in the range of 65 to 90 Shore A.

17. An adjustable elastomer torsion device, according to claim 16, in which the other torsion member is of rigid tubular configuration coaxial with the one torsion member.

18. An adjustable elastomer torsion device, according to claim 17, in which the other torsion member is of molded urethane resin with a plurality of longitudinally extending metal stiffener elements molded integrally therein.

19. An adjustable elastomer torsion device comprising:
    a base member;
    a resilient elastomer torsion member having an overlap portion aligned in nested relation with the base member and an extension portion projecting beyond the base member;
    interlock means, interconnecting the base member and the torsion member, for limiting relative twisting between the base member and the overlap portion of the torsion member without preventing twisting of the extension portion of the torsion member relative to the base member; and
    adjustment means for adjusting the positions of the base and torsion members longitudinally relative to each other, over a given displacement length, thereby varying the length of the extension portion and adjusting the overall resilient, elastomeric torsional restoration force of the device over a predetermined range.

20. An adjustable elastomer torsion device according to claim 19 in which the base member is also formed of a twistable, resilient elastomer resin.

21. An adjustable elastomer torsion device according to claim 19 in which the base member is of a stiff, relatively untwistable construction.

22. An adjustable elastomer torsion device, according to claim 19, and further comprising:
   an elongated rack member aligned paraxially with the base member and the torsion member;
   in which the adjustment means interconnects the rack member and the torsion member.

23. An adjustable elastomer torsion device, according to claim 19, in which the base member and the torsion member are disposed in nested relation to each other and the interlock means comprises at least one key on one of those members and a keyway on the other of those members, with the key projecting into and interlocking in the keyway.

24. An adjustable elastomer torsion device, according to claim 23, in which each key and each keyway is of T-shaped cross-sectional configuration.

25. An adjustable elastomer torsion device, according to claim 23, and further comprising:
   an elongated rack member aligned paraxially with the base member and the torsion member;
   in which the adjustment means interconnects the rack member and the torsion member.

26. An adjustable elastomer torsion device, according to claim 19, in which:
   the base member has an elongated central opening; and
   the torsion member extends into the central opening of the base member.

27. An adjustable elastomer torsion device, according to claim 26, in which:
   the interlock means comprises a plurality of keys of T-shaped cross-sectional configuration extending lengthwise of one of the base and torsion members, and a corresponding plurality of T-shaped keyways extending lengthwise of the other of the base and torsion members, with each key fitting into a keyway.

28. An adjustable elastomer torsion device, according to claim 19, in which:
   the interlocking means comprises a plurality of keys of T-shaped cross-sectional configuration extending lengthwise of one of the base and torsion members, and a corresponding plurality of T-shaped keyways extending lengthwise of the other of the base and torsion members, with each key fitting into a keyway.

29. An adjustable elastomer torsion device, according to claim 28, in which the base and torsion members are both of molded urethane resin, the base member is disposed in encompassing relation to the torsion member, and the base member is stiffened by a plurality of metal stiffener elements molded integrally therein.

* * * * *